2,909,487

NUCLEAR REACTOR COOLANT

Eugene L. Colichman, Los Angeles, Calif., assignor, by mesne assignments, to the United States of America as represented by the United States Atomic Energy Commission No Drawing. Application July 13, 1954
Serial No. 443,132

6 Claims. (Cl. 252—74)

The present invention concerns the formulation of a new and novel reactor coolant. More specifically, the invention is directed to formulating specific reactor coolants, to methods of inhibiting the polymerization of organic nuclear coolants, giving high pyrolitic and radiation stability to the core, and to methods of cooling a nuclear employing increased safety and operating efficiency.

Various organic compounds have been suggested for use as a primary or secondary coolant in a nuclear reactor. Although the heat exchange characteristics of these coolants are satisfactory, their use has been severely limited due to low pyrolitic and radiation stabilities. Heretofore, no practical solution has been suggested to prevent the simultaneous polymerization of the dissociation products (resulting from pyrolitic and radiolitic decomposition) of the reactor coolant during operation, or to increase the over-all stability of the reactor coolant. The alpha, beta, gamma, fast neutron and other radiation energies emitted from the nuclear reactor and termed herein as "nuclear irradiations" have been found to have a definite tendency to cause formation of organo free radicals in the coolant presumably due to cleavage of the ring structure of the organic coolant. Furthermore, certain alkali metals have been proposed as nuclear coolants. For example, sodium has been investigated as such a coolant. Molten sodium, of course, inherently involves severe corrosion problems and pumping problems, as well as the unwanted tendency of the sodium to become radioactive creating a severe safety problem. It has been determined that the addition or dispersion of certain metals in the organic coolant will enable the organo free radicals to react with these metallic elements. Thus, during the irradiation of the coolant in a reactor the dispersed metal will form organometallic compounds within the organic-metal dispersion. A mixture of particular organic coolants and the proper metal when heated and irradiated in the nuclear reactor will form organimetallic compounds in the mixture and will considerably increase the efficiency and stability of the reactor coolant, increase the thermal conductivity of the coolant permitting lower flow velocities and increase the safety factor over use of alkali metal alone due to the blanketing action of the organic coolant.

When an organic compound is used as a secondary coolant (i.e., not in a direct heat transfer relation with the reactor core) it will be subjected to high temperatures (400–1000° F.) and gamma radiation. If it were assumed that sodium was the primary coolant the gamma radiation could be from $Na^{24}$ decay having an activity of $10^{13}$ to $10^{15}$ disintegrations/sec. cc. When primary coolant usage is contemplated the organic coolant will be subjected to fast neutron fluxes ($1 \times 10^{12}$ to $2 \times 10^{13}$ neutrons/sec. cm.$^2$), thermal neutron fluxes ($5 \times 10^{12}$ to $1 \times 10^{14}$ neutrons/sec. cm.$^2$), and gamma activity ($1 \times 10^{11}$ to $1 \times 10^{13}$ mev./sec. cc.) at temperatures of 400–1000° F. For shield applications the organic coolant will be subjected to small fluxes of fast neutrons and gamma rays.

It is therefore an object of this invention to provide a new and novel organic nuclear coolant.

A further object of this invention is to provide a hydrocarbon coolant having increased stability and efficiency within a nuclear reactor.

A still further object of this invention is to provide an organic coolant of the hydrocarbon type having improved thermal conductivity.

Another object of this invention is to provide a mixture of a dispersed metal and an organic hydrocarbon usable as a nuclear reactor coolant.

A further object of this invention is to provide a method of inhibiting the polymerization of a hydrocarbon coolant during operation in a nuclear reactor.

A still further object of this invention is to provide a method of making an aromatic hydrocarbon nuclear reactor coolant more stable under conditions of operation in the nuclear reactor.

An additional object of this invention is to provide a method of cooling a nuclear reactor in which a metal is dispersed within an organic hydrocarbon coolant.

Another object of this invention is to provide a nuclear reactor coolant having an increased safety factor.

Other objects of this invention will become apparent from the following description.

Organic coolants used in nuclear reactors are subjected to both pyrolitic and radiation decomposition when such coolant is used in an operating reactor. This decomposition, it is believed, causes cleavage of the bonds of the ring structure of the organic coolants forming primary free radical products which tend to polymerize. In order to enhance the operating range, stability, and workability of such coolants it has been desired to prevent or suppress polymerization resulting from the pyrolitic and radiation decomposition. The present invention provides a means for the formation of various organometallic compounds within the operating coolant due to the presence of a dispersed metal within the coolant.

It has been found that the difficulties inherent with an organic coolant per se and a molten alkali metal per se are solved by dispersing an alkali metal within a hydrocarbon carrier. The various alkali metals, lithium, sodium, potassium, rubidium, and cesium will form organometallic compounds corresponding to the formula R—M, where R is an aryl radical and M is the alkali metal. The ease of formation varies with the various members of the alkali metal group, but appears to increase with increasing atomic weight. A mixture of aromatic hydrocarbons and alkali metals on being allowed to operate within a reactor as a coolant will continuously combine due to the tendency of the aryl free radicals, formed by irradiation and pyrolysis to form aromatic alkali organometallics. These organometallic compounds will decompose partially into their original materials and also cause some higher molecular weight fractions to form. The aromatic alkali organometallics formed will tend to lend thermal and nuclear irradiation stability to the organic coolant. In the case of lithium additions the formed lithium organic derivatives can be melted ordinarily without decomposition. Although several of the other alkali metals will form infusable solids, these solids can still be dispersed within the bulk of the liquid hydrocarbon. From the standpoint of neutron capture cross sections the preferred alkali metals would be sodium and rubidium. These metals, having cross sections of 0.49 and 0.70 barn, respectively, would be most useful as primary coolants. The aromatic hydrocarbons used as nuclear coolants have an operating range of from 100°–500° C. dependent on the particular hydrocarbon and the amount and kind of radiation to which the coolant is subjected. These considerations as well as the neutron cross section determine which combinations would be most suitable for use as primary, secondary or intermediate coolants.

As stated above, it is believed that the pyrolitic and radiation effects in a nuclear reactor act to cleave the bonds between the basic ring structure of the hydrocarbon coolant and the radicals attached thereto. This action forms primary free radical products which under normal conditions will link to each other forming complex organic chains which lead to the polymerization or condensation of these products into unwanted and unworkable polymers or resins. The pyrolitic and radiation effects in the nuclear reactor tend to promote the formation of organo free radicals in the coolant. The presence of various alkali metals dispersed within the operating coolant will enable these metals to react with the organo free radicals to form aromatic alkali organometallic compounds during such operation.

The new and novel reactor coolant comprises particular types of organic compounds coupled with particular metals. It has been determined that aromatic hydrocarbons should be used as the base material for the coolant, due to their stability when subjected to pyrolitic and radiation effects. The applicable hydrocarbons are the polyphenyls and the condensed ring compounds. Specifically, biphenyl, ortho, meta, or para-terphenyl, or the quaterphenyls may be given as examples of the polyphenyls used, while naphthalene, anthracene, and phenanthrene may be given as examples of the condensed ring compounds. The operating range of the above hydrocarbon coolants may generally be given as from 100°–500° C. The above hydrocarbons have melting points which enable them to be in the liquid state in this range. For example, meta-terphenyl melts at approximately 87° C., para-terphenyl melts at 213° C. and p-quaterphenyl melts at a value over 300° C.

Specific formulations of coolant may be made using the above hydrocarbons and various amounts of cesium, rubidium, potassium, sodium, or lithium. The metals may be added to the core as an additive in the amounts of 0.1 to 10%. These percentages of metal within the coolant make available sufficient metal to form organometallic compounds with the organo free radicals formed by the pyrolitic and irradiation decomposition of the organic material. The metals used, when in powder form, must be of such particle size that they stay evenly dispersed within the circulating coolant mixture. If the operating temperatures are such that the metal is in the molten form a compatible mixture of the above hydrocarbons and the alkali metal can be effected within the above percentile range.

The following is given as an example of practicing the instant invention. Approximately 2.0% of sodium is added to para-terphenyl (98%) in the form of a uniform dispersion. This mixture of sodium and para-terphenyl is circulated within the nuclear reactor coolant system. The circulating coolant is subjected to irradiation within the operating nuclear reactor. The radiation energies from the nuclear reactor promote the formation of aryl organo free radicals in the para-terphenyl which react with the sodium to form an aromatic sodium organometallic compound such as sodium terphenyl. The organometallic compounds formed will themselves dissociate partially due to the irradiation and will also form some higher molecular weight fractions. By the use of the above formulation and methods a compatible mixture of the p-terphenyl and sodium is effected. The irradiation in the reactor causes reaction between the aromatic hydrocarbon and the sodium. The addition of sodium to the p-terphenyl raises the thermal conductivity of the coolant which is highly desirable. Furthermore, presence of the hydrocarbon surrounding the sodium offers an increased safety factor in case of rupture of coolant tubes. The mixture will operate at higher temperatures than hydrocarbons alone due to the greater stability afforded by the formation of the aromatic sodium organometallic compounds. Further, the thermal conductivity of the coolant is increased by the presence of the alkali metal, permitting a lower velocity of flow and a decrease in the pumping power necessary to circulate the coolant.

Although the invention has been described in detail, it is to be clearly understood that the same is by way of example only and is not to be taken by way of limitation, the spirit and scope of this invention being limited only by the terms of the appended claims.

I claim:

1. A nuclear reactor coolant composition consisting essentially of at least one aromatic hydrocarbon selected from the class consisting of polyphenyls and condensed ring compounds having from 2 to about 4 carbon rings, and dispersed therein an alkali metal.

2. A nuclear reactor coolant composition consisting essentially of at least one polyphenyl hydrocarbon compound having from 2 to about 4 phenyl rings and dispersed therein from about 0.1 to about 10% of an alkali metal.

3. The composition of claim 2, wherein the polyphenyl hydrocarbon compound is terphenyl.

4. The composition of claim 2, wherein the polyphenyl hydrocarbon compound is terphenyl and the alkali metal is sodium.

5. The composition of claim 2, wherein the polyphenyl hydrocarbon compound is terphenyl and the alkali metal is lithium.

6. The composition of claim 2, wherein the polyphenyl hydrocarbon compound is terphenyl and the alkali metal is potassium.

References Cited in the file of this patent

UNITED STATES PATENTS

| | | |
|---|---|---|
| 2,013,152 | Hoyt | Sept. 3, 1935 |
| 2,642,345 | Bradley et al. | June 16, 1953 |
| 2,743,223 | McClinton et al. | Apr. 24, 1956 |

FOREIGN PATENTS

| | | |
|---|---|---|
| 697,601 | Great Britain | Sept. 23, 1953 |

OTHER REFERENCES

Chem. Rev. 31 (1942), an article by H. I. Schlesinger and A. B. Burg, page 37.